Aug. 22, 1961     H. E. WEISS     2,997,265
BRACKET
Filed June 27, 1958
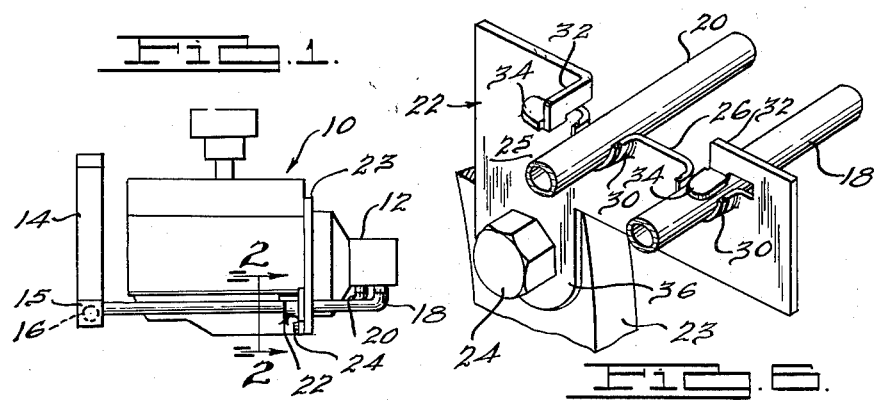
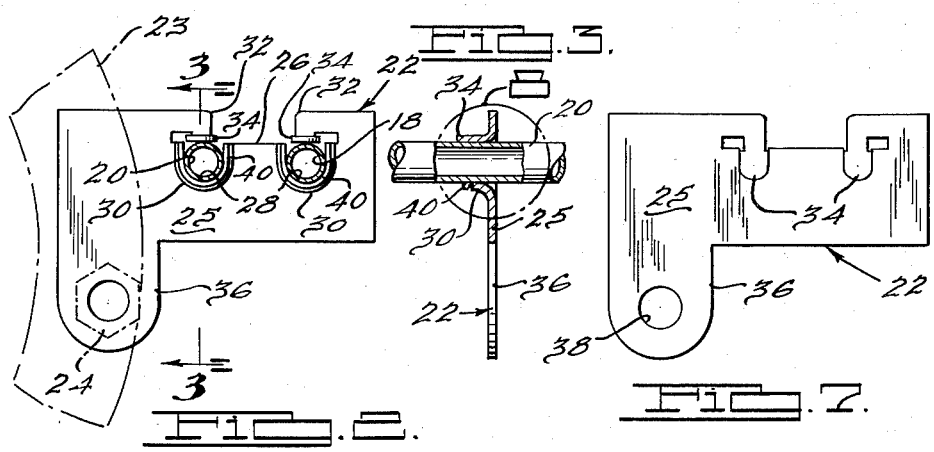
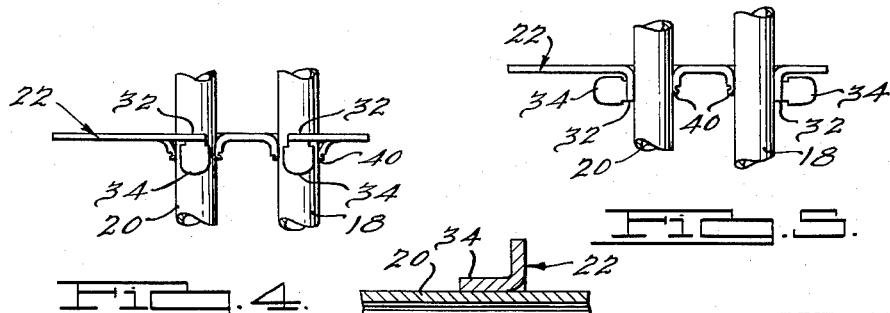
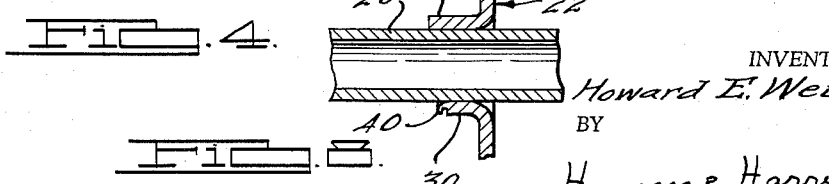
INVENTOR.
Howard E. Weiss,
BY
Harness & Harris
ATTORNEYS.

United States Patent Office 2,997,265
Patented Aug. 22, 1961

2,997,265
BRACKET
Howard E. Weiss, Oak Park, Mich., assignor to Chrysler Corporation, Highland Park, Mich., a corporation of Delaware
Filed June 27, 1958, Ser. No. 745,005
9 Claims. (Cl. 248—68)

This invention relates to a novel bracket for supporting conduits, and in particular relates to supporting flexible, thin-walled, conduits on automobiles.

In automotive installations using flexible conduits having relatively soft or fracturable outer covering, a problem of securing these conduits in proper position is encountered due to the fact that the brackets and the locking means thereon used to hold these conduits in place frequently have relatively sharp edges. The vibration of automotive parts causes these sharp edges of the mounting brackets or even substantially smooth edges of narrow mounting brackets to eventually wear through the relatively soft walls of the conduits which may be either electrical conduits or fluid conduits. A particular problem is presented by the mounting and securement of transmission fluid cooling conduits which conduits must extend from the transmission housing to the front of the engine as as to terminate in a tank portion of the radiator. The pressurized fluid in these conduits and the aforementioned vibrations transmitted to the conduits imposes a load upon any mounting brackets used to secure these conduits in their proper spacial relationship in the automotive structure and particularly when the brackets are secured to the transmission housing flange.

A further installation problem is presented in the placement of these conduits on or in such a bracket which placement ofttimes becomes a tedious operation due to the relatively inaccessible position of the conduits and the radiator portion which cools the transmisison fluid. It becomes essential therefore for installation of these conduits that a mounting means or bracket be provided which is adaptable to first readily receive conduits and to provide locking means that may be engaged to thereafter hold these conduits securely with a minimum of effort on the part of the installer. It is further necessary to provide the bracket with some means which will eliminate the cutting or destructive effect of the bracket due to vibrations of the tubing and/or brackets, particularly in conduit installations of the electrical or transmission fluid or brake fluid types. A wearing through of these conduits would obviously lead to serious mechanical failure and possibly very dangerous consequences.

The present invention contemplates providing a very simple and expedient bracket for obviating the aforementioned difficulties. This bracket is made from relatively thin sheet steel and is provided with U-shaped conduit mounting flanges or grooves projecting transversely from the flat side of said thin sheet. An adjustable locking means or locking tab is bendable into and out of engagement with the conduits after they have been placed in the grooves or flanges. The flanges are formed by a die pressing operation and are made as long and as smooth as necessary to provide the best mounting surfaces for a particular type and weight of conduit.

An object of this invention is to provide a means to mount flexible, relatively thin or soft-walled conduits in properly spaced relationship on vibrating machines such as automotive engines.

Another object is to provide a mounting means for flexible, relatively soft-walled, conduits which means has smooth bearing surfaces upon which the conduits rest or ride and which bearing surfaces prevent the mounting means from injuring the conduits.

Another object is to provide a mounting means having smooth bearing surfaces and having a locking means movable into engagement with said conduits by a simple bending process for holding the conduits in place on the mounting means.

Another object is to provide a mounting means having a tab-like locking means thereon movable out of the path of the conduits to allow the conduits to be readily placed in the mounting means, said locking means being readily movable into locking engagement with the conduits after they have been placed in the mounting means.

A more complete understanding of the invention may be had with reference to the drawings, in which:

FIGURE 1 represents an automotive engine having a pair of transmission fluid cooling conduits mounted thereon by means of the present bracket;

FIGURE 2 represents a view of the bracket and conduits of FIGURE 1 taken along the line 2—2 of FIGURE 1;

FIGURE 3 represents a cross sectional view of the bracket and conduits taken along the line 3—3 of FIGURE 2;

FIGURE 4 represents a top elevational view of the bracket and conduits of FIGURE 2;

FIGURE 5 represents a top elevational view of the bracket and conduits of FIGURE 2 showing the locking tabs in their retracted position;

FIGURE 6 represents an isometric view of the bracket and conduits of FIGURE 2 showing one locking tab engaged and the other in retracted position;

FIGURE 7 represents a sheet metal blank of the bracket of FIGURE 2 prior to the bending of the tabs from the plane of the blank; and FIGURE 8 is an enlarged fragmentary view of the flange portion of the bracket shown in circle 8 of FIGURE 3.

In FIGURE 1 is shown an automotive engine generally designated as 10 having a transmission 12, and a radiator 14 connected thereto. Radiator 14 has a bottom tank 15 that includes a transmission oil cooler portion 16 that communicates with the transmission 12 through the conduits 18 and 20. These conduits are secured to the engine in properly spaced relationship by means of a bracket 22 which embodies this invention. Bracket 22 is secured to a convenient portion or flange 23 of the engine 10 or transmission 12 by means of a bolt or other convenient securing means designated as 24. Conduits 18 and 20 are formed from a flexible material of a composition which affords a high resistance to corrosion by oil, gas, moisture, and other materials which normally are present around an automotive engine. An example of such a composition would be a flexible type of natural or synthetic rubber such as styrene-butadiene which material affords the aforementioned resistance but which is susceptible to being cut and fractured by any notably sharp edge with which it might come in contact. Copper and brass tubing are other materials that might be supported by a bracket of the disclosed type.

Referring to FIGURES 2 and 3, bracket 22 comprises a relatively thin sheet of material, preferably metal but possibly some other relatively strong material, which may be bent into a new shape and which may retain the new shape. An example of such material might be a thermosetting plastic material of the type which is deformable and curable after being deformed to produce the stable new shape. The bracket 22 having a substantially flattened body 25 is provided with an edge portion 26 into which notches 28 and flanges 30 have been formed by means of a die pressing operation. The flanges 30 provide smooth mounting or bearing surfaces for the conduits 18 and 20. Overhanging these conduits and integral with the bracket body 25 are projections 32 which are bendable transversely from the plane of the body as shown in FIGURE 5 to a position which allows the conduits to be readily placed in the grooves. These projections are bendable back into the position shown in FIGURE 4 in which positions they overlie the conduits. These projections 32 are provided with locking tabs 34 which have flat bearing surfaces facing the bottom of the grooves. The spacing of these locking tabs 34 from the bottom of the grooves is such that when projections 32 are bent from the position shown in FIGURE 5 to that shown in FIGURES 2 and 4 they will come into frictional engagement with conduits 18 and 20 to retain these conduits securely in the grooves. The flat bearing surfaces of these locking tabs and the bearing surfaces in the grooves are substantially parallel and provide a substantially continuous mounting surface for large portions of the periphery of the conduits. The length of the grooves and the length of the locking tabs are sufficient to avoid abrasion of the conduits and are variable according to the size of the conduits and of the material of the conduits. Since the flanges 30 are formed by a die forming operation a lip 40 (see FIGURE 8) is formed on the outer edge of each of said flanges which lip tends to roll outwardly from the longitudinal axis of the grooves during the forming of the flanges. This lip 40 provides a smooth end to the flanges which further prevents abrasion of the conduits due to motion of the conduits to the right as viewed in FIGURE 3. The size of the lip 40 is determined by the severity of the formation of the flange and the hardness of the material used for the bracket. It is noted that this lip 40 is formed simultaneously with the formation of the flanges and obviates further machining operations to smooth the end of the flange. The bracket 22 is provided with a projection 36 having a mounting bolt aperture 38 therein for securing the bracket to a suitable portion of the engine 23 as shown in FIGURES 1 and 6.

The blank shown in FIGURE 7 may be formed into the bracket 22 shown in FIGURE 2 by one press operation which simultaneously forms the flanges, lips, and locking tabs. Any number of flanges and grooves may be provided in a similar manner by varying the size of the blank in FIGURE 7. The gradual and smooth curvature of the flanges 30 is shown in the isometric view of FIGURE 6, which smooth curvature helps to prevent any brasion during and after installation of the conduits in the bracket.

I claim:

1. A bracket comprising a body, a notch in said body, and a projection on said body, said projection having a portion comprising a flat surface offset from the longitudinal axis of said notch and being movable substantially in the plane of said flat surface through bending of said projection into an overlying axial relationship with said notch to substantially define in cooperation with said notch an aperture in said body.

2. A bracket comprising a body, a notch in said body, and a projection on said body, said projection having a bearing surface offset from the longitudinal axis of said notch and being movable substantially in a plane translated from said axis of said notch to a position overlying said notch to substantially define in cooperation with said notch an aperture in said body.

3. A bracket comprising a sheet-like body, a notch in said body having its axis transverse to the plane of said body, said notch being formed with a flange extending outwardly from said plane, and a bearing surface on said body positioned in a plane displaced from the bottom of said notch, said surface being movable in its plane into an overlying relationship with said notch to substantially define in cooperation therewith an aperture in said body.

4. A bracket for mounting a fabric conduit comprising a thin body having an edge portion, a transverse notch in said edge portion being defined in part by a flange extending transversely of the body plane for a distance approximately twice the thickness of said body, and a bearing surface on said body overlying and extending axially of said notch in the same direction as said flange, said bearing surface having a width approximately one-half the width of said notch and adapted to retain said conduit in said notch, said surface being movable in a plane offset from all planes intersecting said notch to a position not overlying said notch.

5. A bracket for mounting a fabric conduit comprising a thin body having an edge portion, a transverse notch in said edge portion being defined in part by a flange extending transversely of the plane of said body for a distance approximately twice the thickness of said body, said flange being an integral portion of said body and formed therefrom by a metal forming press operation, a locking tab on said body overlying and extending axially of said notch in the same direction as said flange, said tab having a width approximately one-half the width of said notch and adapted to retain said conduit in said notch, said tab being movable in a plane spaced a predetermined distance above the bottom of said notch, and securing means on said body for mounting said bracket to another structure.

6. A member for supporting non-metal conduits comprising a thin body having an edge portion, a plurality of U-shaped recesses in said edge portion, a U-shaped flange around at least a portion of the edge of each of said recesses and extending outwardly from said body to define U-shaped troughs, each of said flanges being integral with said body along a smooth radius and being formed from said body by a metal forming operation, a plurality of projections integral with said body, and each one of said projections having a flat bearing surface facing the bottom of the trough associated therewith, said bearing surfaces being movable in a plane displaced above the bottom of said troughs.

7. A member for supporting non-metal conduits comprising a thin body having an edge portion, a U-shaped recess in said edge, said recess having its axis transverse to the plane of said body, a U-shaped flange around the edge of said recess and extending outwardly from said body to define a U-shaped trough having its axis transverse to said body, said flange being integral with said body along a smooth radius and being formed from said body by a metal forming press operation, a lip on the end of said flange formed by said press operation, and a projection integral with said body and having a flat bearing surface facing the bottom of said trough, said surface being movable in a plane displaced above the bottom of said trough to a position overlying said trough.

8. A member for supporting non-metal conduits comprising a thin body having an edge portion, a U-shaped recess in said edge portion, said recess having its axis transverse to the plane of said body, a U-shaped flange around the edge of said recess and extending outwardly from said body to define a U-shaped trough having its axis transverse to said body, said flange being integral with said body along a smooth radius and being formed from said body by a metal forming press operation, and a flat surface integral with said body, said surface lying in a plane above the bottom of said trough and extending laterally of the axis of said trough, said surface being movable in said plane from said offset position to a position overlying said trough and extending axially thereof.

9. A bracket for mounting a conduit comprising a relatively thin sheet-like body having an edge portion, a notch in said edge portion having its longitudinal axis substantially transverse to the body plane, said notch being defined by a flange extending outwardly from said body plane to provide a conduit bearing surface, and a bearing surface integral with said body and positioned in a plane displaced from the bottom of said notch and being movable in said latter plane to a position overlying said notch to substantially define in cooperation therewith an aperture in said body.

References Cited in the file of this patent

UNITED STATES PATENTS

| | | |
|---|---|---|
| 2,604,282 | Stearns | July 22, 1952 |
| 2,757,962 | MacLeod | Aug. 7, 1956 |
| 2,850,300 | Jennings | Sept. 2, 1958 |

FOREIGN PATENTS

| | | |
|---|---|---|
| 486,331 | Canada | Sept. 9, 1952 |
| 549,425 | Canada | Nov. 26, 1957 |
| 813,052 | Germany | Sept. 6, 1951 |
| 1,101,275 | France | Apr. 20, 1955 |